(12) United States Patent
Todoroki

(10) Patent No.: US 10,894,447 B2
(45) Date of Patent: Jan. 19, 2021

(54) PNEUMATIC TIRE

(71) Applicant: SUMITOMO RUBBER INDUSTRIES, LTD., Kobe (JP)

(72) Inventor: Daisuke Todoroki, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 490 days.

(21) Appl. No.: 15/402,429

(22) Filed: Jan. 10, 2017

(65) Prior Publication Data

US 2017/0217258 A1  Aug. 3, 2017

(30) Foreign Application Priority Data

Feb. 2, 2016 (JP) .................................. 2016-018050

(51) Int. Cl.
*B60C 13/04* (2006.01)
*B60C 15/06* (2006.01)
(Continued)

(52) U.S. Cl.
CPC .............. *B60C 15/06* (2013.01); *B60C 13/04* (2013.01); *B60C 15/0027* (2013.01);
(Continued)

(58) Field of Classification Search
CPC .............. B60C 2013/045; B60C 13/04; B60C 2015/0614; B60C 15/06; B60C 2013/006; B60C 15/0628
See application file for complete search history.

(56) References Cited

U.S. PATENT DOCUMENTS

| | | | | |
|---|---|---|---|---|
| 5,526,863 A | * | 6/1996 | Hodges | ............... B60C 15/0018 152/541 |
| 2001/0006086 A1 | * | 7/2001 | Benko | ....................... B60C 1/00 152/543 |

(Continued)

FOREIGN PATENT DOCUMENTS

| | | | | |
|---|---|---|---|---|
| EP | 2657049 A1 | * | 10/2013 | ............. B60C 13/04 |
| JP | 06024216 A | * | 2/1994 | ......... B60C 15/0607 |

(Continued)

OTHER PUBLICATIONS

Machine Translation: JP-2012254736-A; Todoroki, Daisuke; (Year: 2019).*

(Continued)

*Primary Examiner* — Kendra Ly
(74) *Attorney, Agent, or Firm* — Birch, Stewart, Kolasch & Birch, LLP

(57) ABSTRACT

In a tire 2 of the present invention, sidewalls 6 each include an outer layer 6a, and an inner layer 6b disposed inward of the outer layer 6a in the axial direction. The inner side end, in the radial direction, of the inner layer 6a extends to a region between a bead 10 and a chafer 8. When Po represents a contact point, on an outer surface of the tire 2, at which the outer layer 6a and the chafer 8 contact with each other, an inner side end, in the radial direction, of the outer layer 6a is equal to the contact point Po. In the radial direction, an outer side end 44 of the chafer 8 is disposed outward of the contact point Po. In the radial direction, an inner side end 46 of the inner layer 6b is disposed inward of the contact point Po.

9 Claims, 2 Drawing Sheets

(51) Int. Cl.
 *B60C 13/00* (2006.01)
 *B60C 15/00* (2006.01)
(52) U.S. Cl.
 CPC .. *B60C 2013/006* (2013.01); *B60C 2013/045* (2013.01); *B60C 2015/0614* (2013.01); *B60C 2015/0621* (2013.01); *B60C 2200/06* (2013.01)

(56) References Cited

U.S. PATENT DOCUMENTS

| | | | | |
|---|---|---|---|---|
| 2005/0211362 A1* | 9/2005 | Hirayama | ............... | B60C 15/06 152/547 |
| 2007/0029022 A1* | 2/2007 | Tanaka | ...................... | B60C 9/14 152/541 |
| 2007/0151649 A1* | 7/2007 | Numata | .................. | B60C 13/04 152/525 |
| 2009/0188601 A1* | 7/2009 | Kuniyasu | ................ | B60C 15/06 152/541 |

FOREIGN PATENT DOCUMENTS

| | | | | | |
|---|---|---|---|---|---|
| JP | 2002178724 A | * | 6/2002 | ......... | B60C 15/0607 |
| JP | 2012254736 A | * | 12/2012 | | |

OTHER PUBLICATIONS

Machine Translation: JP-2002178724-A; Niimura, Kyoji; (Year: 2019).*
Machine Translation: JP-06024216-A, Io, Moriyuki, (Year: 2020).*

* cited by examiner

PNEUMATIC TIRE

This application claims priority on Patent Application No. 2016-018050 filed in JAPAN on Feb. 2, 2016. The entire contents of this Japanese Patent Application are hereby incorporated by reference.

BACKGROUND OF THE INVENTION

Field of the Invention

The present invention relates to pneumatic tires. More specifically, the present invention relates to heavy duty pneumatic tires which are to be mounted to vehicles such as trucks, buses, and the like.

Description of the Related Art

In recent years, reduction of fuel consumption is particularly strongly required for vehicles in consideration of the environment. Tires exert influence on fuel efficiency of vehicles. Therefore, development of a "fuel-efficient tire" that contributes to reduction of fuel consumption is advanced. In order to achieve, by a tire, reduction of fuel consumption, it is important to reduce rolling resistance of the tire. When a tire rolls, deformation and restoration are repeated. Energy loss caused by the deformation and restoration is a main cause of rolling resistance of the tire. Reduction of the energy loss is important for reducing rolling resistance. Reduction of the energy loss in sidewalls is also required.

A tire in which energy loss is reduced in sidewalls is disclosed in JP2007-196988 (US2007/0151649). In the tire, each sidewall has a two-layer structure that includes an outer rubber portion and an inner rubber portion. The inner rubber portion is formed of rubber (low heat generating rubber) having a loss tangent that is less than that of conventional rubber, whereby rolling resistance is reduced. The outer rubber portion is formed of rubber having a loss tangent and a complex elastic modulus that are higher than those of the inner rubber portion, whereby reduction of durability is inhibited.

Increased reduction of rolling resistance is required since reduction of fuel consumption is highly required for vehicles. In addition, tires are required to maintain high durability.

In order to further reduce rolling resistance, a method for increasing the proportion of low heat generating rubber used for a tire may be considered. This can be realized by the inner rubber of sidewalls being extended to bead portions. However, heavy load is applied to the bead portions from a rim. Chafers have a complex elastic modulus that is higher than that of the sidewalls in order to protect the bead portions. If the inner rubber having low complex elastic modulus and loss tangent is extended to the bead portions, strain in the portions may be increased. This may cause generation of cracks in an interface between the outer rubber and the chafer. This may cause reduction of durability of the tire.

An object of the present invention is to provide a pneumatic tire that allows rolling resistance to be further reduced, and also allows high durability to be achieved.

SUMMARY OF THE INVENTION

A pneumatic tire according to the present invention includes: a tread having an outer surface which forms a tread surface; a pair of sidewalls that extend almost inward from ends, respectively, of the tread in a radial direction; chafers disposed inward of the sidewalls, respectively, in the radial direction; and a pair of beads disposed inward of the chafers, respectively, in an axial direction. The sidewalls each include an outer layer, and an inner layer disposed inward of the outer layer in the axial direction. The inner layer extends to a region between a corresponding one of the beads and a corresponding one of the chafers. The outer layer contacts with a corresponding one of the chafers. When Po represents a contact point, on an outer surface of the tire, at which the outer layer and a corresponding one of the chafers contact with each other, an inner side end, in the radial direction, of the outer layer is equal to the contact point Po. In the radial direction, an outer side end of each chafer is disposed outward of the contact point Po. In the radial direction, an inner side end of the inner layer is disposed inward of the contact point Po. A loss tangent LTi of the inner layer is less than a loss tangent LTo of the outer layer and a loss tangent LTc of the chafers.

The inventors have examined in detail a structure of the sidewalls each of which includes: the inner layer having a low loss tangent; and the outer layer having a loss tangent higher than the inner layer. As a result, it has been found that, even if the inner layer is extended to the bead portion, in a case where a position of the inner layer and a position of a boundary between the outer layer and the chafer are appropriately adjusted, durability can be advantageously maintained.

In the tire according to the present invention, the sidewalls each include the inner layer and the outer layer. The loss tangent of the inner layer is less than the loss tangents of the outer layer and the chafer. The inner layer is formed of low heat generating rubber. The inner layer extends to a region between the bead and the chafer. The inner layer is extended to the bead portion. The proportion of the low heat generating rubber used for the tire is greater than that for conventional tires. In the tire, rolling resistance is reduced. Further, the inner layer allows heat generation in the bead portion to be reduced. This inhibits reduction of durability of the bead portion. In the tire, durability is advantageously maintained.

In the tire, when Po represents a contact point, on the outer surface of the tire, at which the outer layer and the chafer contact with each other, the inner side end, in the radial direction, of the outer layer is equal to the contact point Po. In the radial direction, the outer side end of the chafer is disposed outward of the contact point Po, and the inner side end of the inner layer is disposed inward of the contact point Po. That is, in a region between the contact point Po and the outer side end of the chafer in the radial direction, the chafer is disposed between the outer layer and the inner layer. In this structure, even if the inner layer extends to the bead portion, strain at the interface between the outer layer and the chafer is reduced. In the tire, generation of cracks at the interface between the outer layer and the chafer is inhibited. In the tire, durability is advantageously maintained.

Preferably, a ratio (Hi/Hr) of a height Hi, in the radial direction, from a bead base line BBL to the inner side end of the inner layer, relative to a height Hr, in the radial direction, from the bead base line BBL to an outer side end of a flange of a rim on which the tire is mounted, is greater than or equal to 0.0 and not greater than 1.5.

Preferably, when Hr represents a height, in the radial direction, from a bead base line BBL to an outer side end of a flange of a rim on which the tire is mounted, L1 represents an imaginary line that extends in the axial direction such that a distance, in the radial direction, from the bead base line BBL to the imaginary line L1 is 2.5 times the height Hr, Ti represents a thickness, of the inner layer, measured along the imaginary line L1, and Tc represents a thickness, of each chafer, measured along the imaginary line L1, a ratio (Ti/Tc) of the thickness Ti to the thickness Tc is greater than or equal to 0.5 and not greater than 1.5.

Preferably, when Hr represents a height, in the radial direction, from a bead base line BBL to an outer side end of a flange of a rim on which the tire is mounted, and Ho represents a height, in the radial direction, from the bead base line BBL to the contact point Po, a ratio (Ho/Hr) of the height Ho to the height Hr is greater than or equal to 1.5 and not greater than 3.0.

Preferably, when Hr represents a height, in the radial direction, from a bead base line BBL to an outer side end of a flange of a rim on which the tire is mounted, and Hc represents a height, in the radial direction, from the bead base line BBL to the outer side end of each chafer, a ratio (Hc/Hr) of the height Hc to the height Hr is greater than or equal to 3.0 and not greater than 5.0.

Preferably, the loss tangent LTi is higher than or equal to 0.02 and not higher than 0.05.

Preferably, the loss tangent LTo is higher than or equal to 0.05 and not higher than 0.10.

Preferably, the loss tangent LTc is higher than or equal to 0.10 and not higher than 0.30.

DESCRIPTION OF THE PREFERRED EMBODIMENTS

The following will describe in detail the present invention based on preferred embodiments with reference where appropriate to the accompanying drawing.

Figure 1:
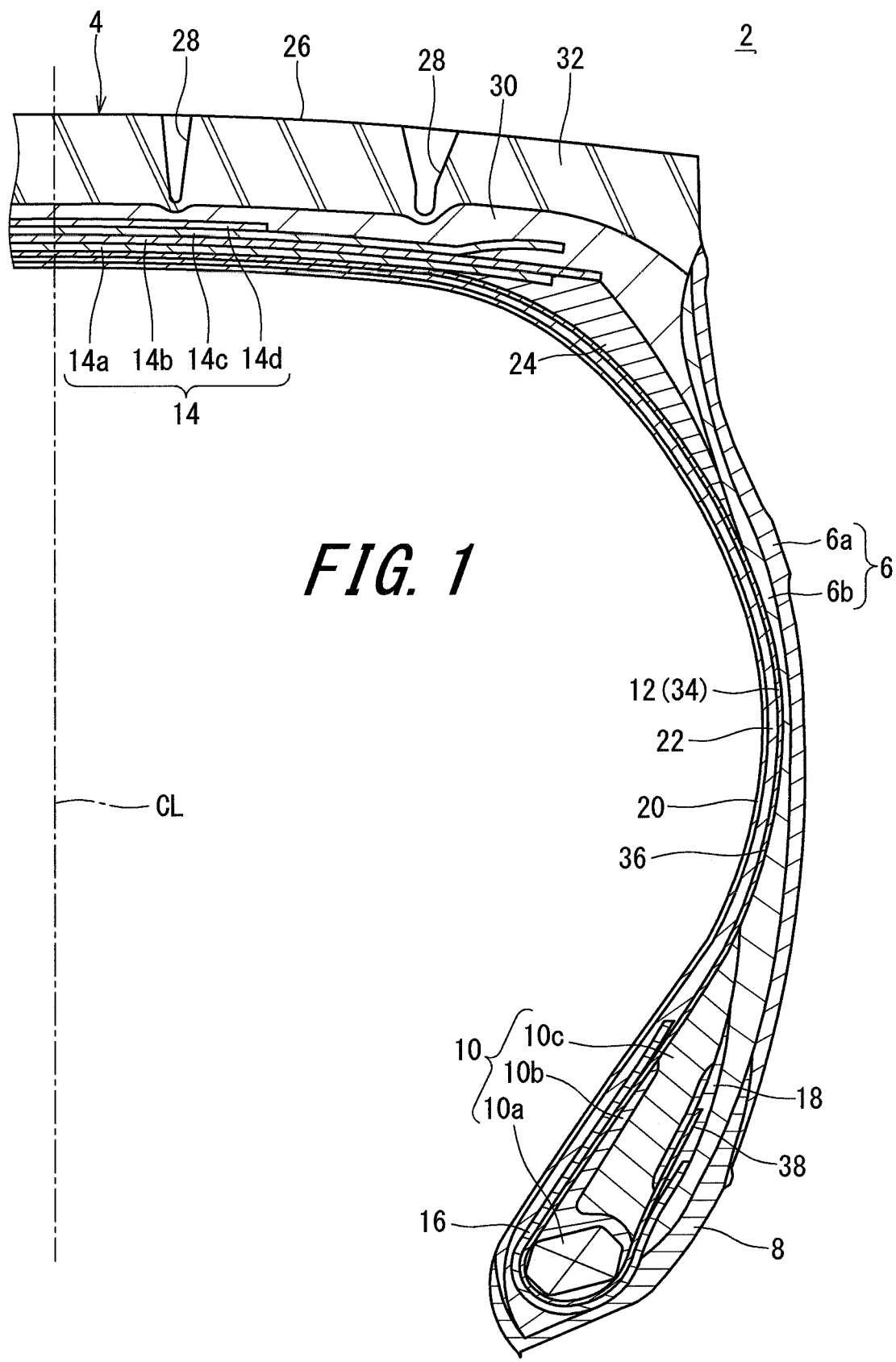
FIG. 1 is a cross-sectional view of a part of a tire according to one embodiment of the present invention.

FIG. 1 shows a pneumatic tire 2. In FIG. 1, the up-down direction represents the radial direction of the tire 2, the left-right direction represents the axial direction of the tire 2, and the direction perpendicular to the surface of the drawing sheet represents the circumferential direction of the tire 2. In FIG. 1, an alternate long and short dash line CL represents the equator plane of the tire 2. The shape of the tire 2 is symmetric about the equator plane except for a tread pattern.

The tire 2 includes a tread 4, sidewalls 6, chafers 8, beads 10, a carcass 12, a belt 14, fillers 16, cover rubbers 18, an inner liner 20, an insulation 22, and cushion layers 24. The tire 2 is of a tubeless type. The tire 2 is mounted to a truck, a bus, or the like. The tire 2 is a heavy duty tire.

The tread 4 has a shape that projects outward in the radial direction. The tread 4 forms a tread surface 26 that can contact with a road surface. The tread surface 26 has grooves 28 formed therein. A tread pattern is formed by the grooves 28. The tread 4 includes a base layer 30 and a cap layer 32. The cap layer 32 is disposed outward of the base layer 30 in the radial direction. The cap layer 32 is layered over the base layer 30. The base layer 30 is formed of crosslinked rubber excellent in adhesiveness. A typical base rubber of the base layer 30 is natural rubber. The cap layer 32 is formed of crosslinked rubber excellent in wear resistance, heat resistance, and grip performance.

The sidewalls 6 extend almost inward from ends of the tread 4 in the radial direction. As shown in FIG. 1, each sidewall 6 includes an outer layer 6a and an inner layer 6b.

The outer layer 6a forms a part of an outer surface of the tire 2. The outer layer 6a is disposed outward of the inner layer 6b in the axial direction. Near the radially inner side ends of the outer layers 6a, the outer layers 6a contact with the chafers 8. The outer layer 6a is formed of crosslinked rubber excellent in external damage resistance and weather resistance.

The inner layer 6b is disposed inward of the outer layer 6a in the axial direction. The inner layer 6b contacts with the axially inner side surface of the outer layer 6a. The inner layer 6b extends to a region between the bead 10 and the chafer 8. The radially inner side end of the inner layer 6b is disposed outward of the bead 10 in the axial direction. The radially inner side end of the inner layer 6b is disposed inward of the chafer 8 in the axial direction.

The outer layer 6a and the inner layer 6b are more flexible than the chafers 8. A complex elastic modulus Eo* of the outer layer 6a and a complex elastic modulus Ei* of the inner layer 6b are less than a complex elastic modulus Ec* of the chafers 8. The flexible outer layer 6a and inner layer 6b contribute to excellent ride comfort.

In the tire 2, a loss tangent LTi of the inner layer 6b is less than a loss tangent LTo of the outer layer 6a and a loss tangent LTc of the chafers 8. The inner layer 6b is formed of low heat generating rubber.

In the present invention, the loss tangents LTi, LTo, and LTc and the complex elastic moduli Ei*, Eo*, and Ec* are measured in compliance with the standard of "JIS K 6394", by using a viscoelasticity spectrometer ("VESF-3" manufactured by Iwamoto Seisakusho), under the following conditions.

Initial strain: 10%
Amplitude: ±2.0%
Frequency: 10 Hz
Deformation mode: tension
Measurement temperature: 30° C.

Each chafer 8 is disposed almost inward of the outer layer 6a in the radial direction. The chafers 8 are disposed outward of the beads 10 and the carcass 12 in the axial direction. When the tire 2 is mounted on a rim, the chafers 8 contact with the rim. By the contact, portions near the beads 10 are protected. Therefore, the chafers 8 are harder than the sidewalls 6. The chafers 8 are formed of crosslinked rubber excellent in wear resistance. The complex elastic modulus Ec* of the chafers 8 is higher than the complex elastic modulus Ei* of the inner layer 6b and the complex elastic modulus Eo* of the outer layer 6a. The loss tangent LTc of the chafers 8 is higher than the loss tangent LTi of the inner layer 6b and the loss tangent LTo of the outer layer 6a.

The beads 10 are disposed inward of the sidewalls 6 in the radial direction. Each bead 10 includes a core 10a, an apex 10b that extends outward from the core 10a in the radial direction, and a packing rubber 10c that extends outward from the apex 10b in the radial direction. The core 10a is ring-shaped. The core 10a includes a plurality of non-stretchable wires. The apex 10b is tapered outward in the radial direction. The apex 10b is formed of highly hard crosslinked rubber. The packing rubber 10c is tapered outward in the radial direction. The packing rubber 10c is flexible. The packing rubber 10c reduces concentration of stress on the end of the carcass 12.

The carcass 12 includes a carcass ply 34. The carcass ply 34 is extended on and between the beads 10 on both sides, along inner sides of the tread 4 and the sidewalls 6. The carcass ply 34 is turned up around the cores 10*a* from the inner side toward the outer side in the axial direction. By the turning-up, the carcass ply 34 includes a main portion 36 and turned-up portions 38.

The carcass ply 34 includes multiple cords aligned with each other, and topping rubber, which is not shown. An absolute value of an angle of each cord relative to the equator plane is from 45° to 90°, and more preferably from 75° to 90°. In other words, the carcass 12 forms a radial structure. The cords are formed of steel. The carcass 12 may include two or more carcass plies 34.

The belt 14 extends in the axial direction on the cross section obtained by cutting the tire 2 at a plane perpendicular to the circumferential direction. The belt 14 is disposed inward of the tread 4 in the radial direction. The belt 14 is disposed outward of the carcass 12 in the radial direction. The belt 14 reinforces the carcass 12. In the tire 2, the belt 14 includes a first layer 14*a*, a second layer 14*b*, a third layer 14*c*, and a fourth layer 14*d*.

In the tire 2, the ends of the second layer 14*b* are disposed outward of the ends of the first layer 14*a* in the axial direction. The ends of the second layer 14*b* are disposed outward of the ends of the third layer 14*c* in the axial direction. The ends of the second layer 14*b* are disposed outward of the ends of the fourth layer 14*d* in the axial direction. In the tire 2, among the first layer 14*a*, the second layer 14*b*, the third layer 14*c*, and the fourth layer 14*d* of the belt 14, the second layer 14*b* has the largest width. In the tire 2, the ends of the second layer 14*b* are the ends of the belt 14.

Each of the first layer 14*a*, the second layer 14*b*, the third layer 14*c*, and the fourth layer 14*d* includes multiple cords aligned with each other, and topping rubber, which is not shown. Each cord is formed of steel. The cords tilt relative to the equator plane. An absolute value of an angle of each cord relative to the equator plane is from 15° to 70°.

The fillers 16 are turned up around the cores 10*a* of the beads 10, respectively. A first end of each filler 16 is disposed inward of the bead 10 in the axial direction. A second end of each filler 16 is disposed outward of the bead 10 in the axial direction. The fillers 16 are layered over the carcass ply 34. Each filler 16 includes multiple cords aligned with each other, and topping rubber. Each cord is formed of steel. The filler 16 is referred to also as a steel filler 16. The fillers 16 can contribute to durability of the tire 2.

Each cover rubber 18 is disposed outward of the apex 10*b* in the axial direction. The cover rubbers 18 cover the ends of the turned-up portions 38 of the carcass ply 34, as illustrated in the drawings.

The inner liner 20 forms an inner surface of the tire 2. The inner liner 20 is formed of crosslinked rubber. For the inner liner 20, rubber excellent in airtightness is used. A typical base rubber of the inner liner 20 is isobutylene-isoprene-rubber or halogenated isobutylene-isoprene-rubber. The inner liner 20 maintains internal pressure of the tire 2.

The insulation 22 is disposed outward of the inner liner 20. The insulation 22 is disposed inward of the carcass 12. The insulation 22 is disposed between the carcass 12 and the inner liner 20. The insulation 22 is formed of crosslinked rubber excellent in adhesiveness. The insulation 22 is joined firmly to the carcass 12, and is also joined firmly to the inner liner 20. The insulation 22 allows separation of the inner liner 20 from the carcass 12 to be inhibited.

The cushion layers 24 are layered over the carcass 12 near the ends of the belt 14. The cushion layers 24 are formed of flexible crosslinked rubber. The cushion layers 24 absorb stress at the ends of the belt 14. The cushion layers 24 allow lifting of the belt 14 to be inhibited.

Figure 2:
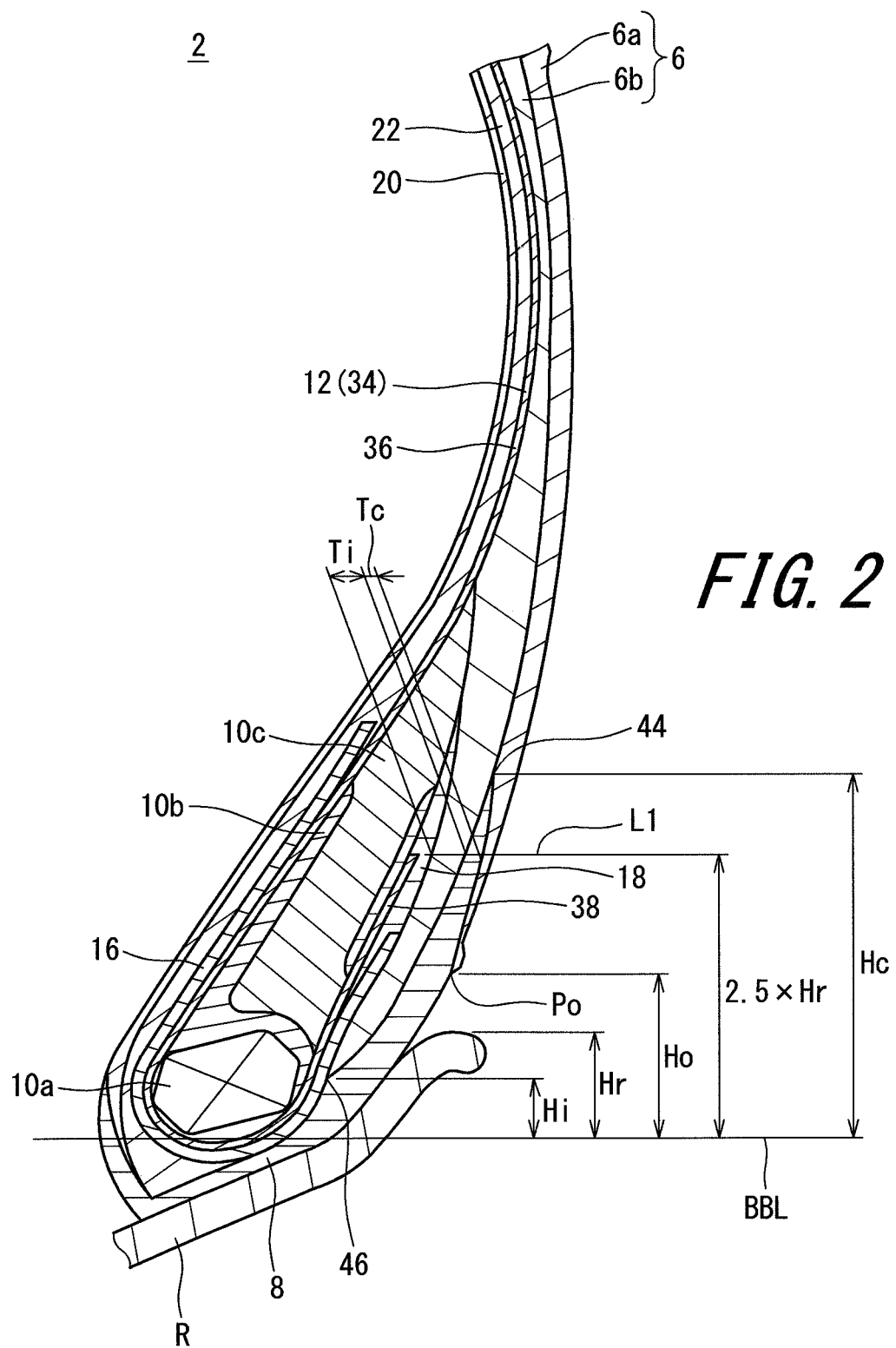
FIG. 2 is an enlarged cross-sectional view of a part of the tire shown in FIG. 1.

FIG. 2 is an enlarged cross-sectional view of the tire 2 shown in FIG. 1 and illustrates a bead 10 portion. In FIG. 2, the up-down direction represents the radial direction, the left-right direction represents the axial direction, and the direction perpendicular to the surface of the drawing sheet represents the circumferential direction. In FIG. 2, reference character R represents a rim on which the tire 2 is mounted. In FIG. 2, the tire 2 is mounted on the rim R. A solid line BBL represents a bead base line. The bead base line BBL corresponds to a line that defines a rim diameter of the rim R (see JATMA). The bead base line BBL extends in the axial direction.

In FIG. 2, reference character Po represents a contact point, on the outer surface of the tire 2, at which the outer layer 6*a* and the chafer 8 contact with each other. The contact point Po is equal to the inner side end, in the radial direction, of the outer layer 6*a*. In the radial direction, an outer side end 44 of the chafer 8 is disposed outward of the contact point Po. In a region between the contact point Po and the outer side end 44 of the chafer 8 in the radial direction, the outer layer 6*a* and the chafer 8 overlap each other in the axial direction. In this region, the chafer 8 is disposed inward of the outer layer 6*a* in the axial direction.

As described above, the inner layer 6*b* extends to a region between the bead 10 and the chafer 8. In the radial direction, an inner side end 46 of the inner layer 6*b* is disposed inward of the contact point Po. In the region between the contact point Po and the outer side end 44 of the chafer 8 in the radial direction, the outer layer 6*a*, the chafer 8, and the inner layer 6*b* overlap each other in the axial direction. In this region, the chafer 8 is disposed between the outer layer 6*a* and the inner layer 6*b*.

Hereinafter, an action and effect of the present invention will be described.

In the tire 2 according to the present invention, as described above, each sidewall 6 includes the inner layer 6*b* and the outer layer 6*a*. The loss tangent LTi of the inner layer 6*b* is less than the loss tangent LTo of the outer layer 6*a* and the loss tangent LTc of the chafers 8. The inner layer 6*b* is formed of low heat generating rubber. The inner layer 6*b* extends to a region between the bead 10 and the chafer 8. The inner layer 6*b* extends to the bead 10 portion. The proportion of the low heat generating rubber used for the tire 2 is greater than that for conventional tires. In the tire 2, rolling resistance is reduced. Further, the inner layer 6*b* allows reduction of heat generation in the bead 10 portion. This inhibits reduction of durability in the bead 10 portion. In the tire 2, durability is advantageously maintained.

In the tire 2, as described above, when Po represents the contact point, on the outer surface of the tire 2, at which the outer layer 6*a* and the chafer 8 contact with each other, the inner side end, in the radial direction, of the outer layer 6*a* is equal to the contact point Po. In the radial direction, the outer side end 44 of the chafer 8 is disposed outward of the contact point Po, and the inner side end 46 of the inner layer 6*b* is disposed inward of the contact point Po. That is, in a region between the contact point Po and the outer side end 44 of the chafer 8 in the radial direction, the chafer 8 is disposed between the outer layer 6*a* and the inner layer 6*b*. In this structure, even if the inner layer 6*b* extends to the bead 10 portion, strain in the interface between the outer layer 6*a* and the chafer 8 is reduced. In this structure, even if the inner layer 6*b* extends to the bead 10 portion, durability is advantageously maintained in the bead 10 portion. The tire 2 is excellent in durability.

In FIG. 2, a double-headed arrow Hi represents a height, in the radial direction, from the bead base line BBL to the inner side end 46 of the inner layer 6b. In FIG. 2, a double-headed arrow Hr represents a height, in the radial direction, from the bead base line BBL to an outer side end of a flange of the rim R. A ratio (Hi/Hr) of the height Hi to the height Hr is preferably less than or equal to 1.5. When the ratio (Hi/Hr) is less than or equal to 1.5, the inner layer 6b allows rolling resistance to be further reduced. In this viewpoint, the ratio (Hi/Hr) is more preferably less than or equal to 1.3. The ratio (Hi/Hr) is preferably not less than 0.0.

When the ratio (Hi/Hr) is not less than 0.0, the inner layer 6b allows generation of strain in the interface between the filler 16 and the chafer 8 near the inner side portion, in the radial direction, of the bead 10 to be effectively inhibited. In the bead 10 portion, durability is advantageously maintained. In this viewpoint, the ratio (Hi/Hr) is more preferably not less than 0.5. When the ratio (Hi/Hr) is 0.0, the inner side end 46 of the inner layer 6b is disposed just on the bead base line BBL.

In FIG. 2, a solid line L1 represents an imaginary line that extends in the axial direction. A distance, in the radial direction, between the bead base line BBL and the imaginary line L1 is 2.5 times the height Hr. A double-headed arrow Ti represents a thickness, of the inner layer 6b, which is measured along the imaginary line L1. That is, the thickness Ti represents a distance, between the inner side surface and the outer side surface of the inner layer 6b, which is measured along the solid line L1. A double-headed arrow Tc represents a thickness, of the chafer 8, which is measured along the imaginary line L1. That is, the thickness Tc represents a distance, between the inner side surface and the outer side surface of the chafer 8, which is measured along the solid line L1.

A ratio (Ti/Tc) of the thickness Ti to the thickness Tc is preferably greater than or equal to 0.5. In the tire 2 in which the ratio (Ti/Tc) is greater than or equal to 0.5, rolling resistance is effectively reduced. In this viewpoint, the ratio (Ti/Tc) is more preferably greater than or equal to 0.7.

The ratio (Ti/Tc) is preferably not greater than 1.5. In the tire 2 in which the ratio (Ti/Tc) is not greater than 1.5, the chafers 8 effectively protect the bead 10 portion. In the tire 2, durability is advantageously maintained. In this viewpoint, the ratio (Ti/Tc) is more preferably not greater than 1.3.

The thickness Ti is preferably greater than or equal to 2.0 mm. The inner layer 6b in which the thickness Ti is greater than or equal to 2.0 mm, effectively contributes to reduction of rolling resistance. In this viewpoint, the thickness Ti is more preferably greater than or equal to 2.5 mm.

The thickness Ti is preferably not greater than 5.5 mm. In the tire 2 having the inner layer 6b in which the thickness Ti is not greater than 5.5 mm, stiffness of the bead 10 portion can be appropriately maintained. Thus, durability is advantageously maintained in the bead 10 portion. In this viewpoint, the thickness Ti is more preferably not greater than 5.0 mm.

The thickness Tc is preferably greater than or equal to 2.0 mm. The chafers 8 in which the thickness Tc is greater than or equal to 2.0 mm, effectively protect the bead 10 portion. In the tire 2, excellent durability is maintained. In this viewpoint, the thickness Tc is more preferably greater than or equal to 2.5 mm.

The thickness Tc is preferably not greater than 5.5 mm. In the tire 2 having the chafers 8 in which the thickness Tc is not greater than 5.5 mm, rolling resistance is effectively reduced. In this viewpoint, the thickness Tc is more preferably not greater than 5.0 mm.

In FIG. 2, a double-headed arrow Ho represents a height, in the radial direction, from the bead base line BBL to the contact point Po. A ratio (Ho/Hr) of the height Ho to the height Hr is preferably less than or equal to 3.0. In the tire 2 in which the ratio (Ho/Hr) is less than or equal to 3.0, stiffness can be appropriately adjusted in the side portion (a portion including both the sidewall 6 and the chafer 8 is referred to as the side portion). The tire 2 is excellent in ride comfort. Further, in the tire 2, rolling resistance is effectively reduced. In this viewpoint, the ratio (Ho/Hr) is more preferably less than or equal to 2.5.

The ratio (Ho/Hr) is preferably not less than 1.5. In the tire 2 in which the ratio (Ho/Hr) is not less than 1.5, even if the side portion is under a heavy load, the chafer 8 contacts with the flange of the rim R. The outer layer 6a does not contact with the flange. In the tire 2, excellent durability is maintained. In this viewpoint, the ratio (Ho/Hr) is more preferably not less than 1.8.

In FIG. 2, a double-headed arrow Hc represents a height, in the radial direction, from the bead base line BBL to the outer side end 44 of the chafer 8. A ratio (Hc/Hr) of the height Hc to the height Hr is preferably less than or equal to 5.0. In the tire 2 in which the ratio (Hc/Hr) is less than or equal to 5.0, stiffness in the side portions can be appropriately adjusted. The tire 2 is excellent in ride comfort. Further, in the tire 2, rolling resistance is effectively reduced. In this viewpoint, the ratio (Hc/Hr) is more preferably less than or equal to 4.5.

The ratio (Hc/Hr) is preferably not less than 3.0. In the tire 2 in which the ratio (Hc/Hr) is not less than 3.0, the chafers 8 effectively protect the bead 10 portion. In the tire 2, excellent durability is maintained. In this viewpoint, the ratio (Hc/Hr) is more preferably not less than 3.5.

The loss tangent LTi is preferably less than or equal to 0.05. When the loss tangent LTi is less than or equal to 0.05 in the inner layer 6b, energy loss can be reduced. In the tire 2, rolling resistance can be low. In this viewpoint, the loss tangent LTi is more preferably less than or equal to 0.045.

The loss tangent LTi is preferably not less than 0.02. In the tire 2 having the inner layer 6b in which the loss tangent LTi is not less than 0.02, excellent durability can be maintained in the bead 10 portion. In the tire 2, high durability is maintained. In this viewpoint, the loss tangent LTi is more preferably not less than 0.03.

The loss tangent LTo is preferably less than or equal to 0.10. In the tire 2 having the outer layer 6a in which the loss tangent LTo is less than or equal to 0.10, energy loss can be reduced. In the tire 2, rolling resistance can be low. In this viewpoint, the loss tangent LTo is more preferably less than or equal to 0.09.

The loss tangent LTo is preferably not less than 0.05. The outer layer 6a in which the loss tangent LTo is not less than 0.05, can sufficiently absorb impact from a road surface. The tire 2 is excellent in ride comfort. In this viewpoint, the loss tangent LTo is more preferably not less than 0.06.

The loss tangent LTc is preferably less than or equal to 0.30. In the tire 2 having the chafers 8 in which the loss tangent LTc is less than or equal to 0.30, energy loss can be reduced. In the tire 2, rolling resistance can be low. In this viewpoint, the loss tangent LTc is more preferably less than or equal to 0.28.

The loss tangent LTc is preferably not less than 0.10. The chafers 8 in which the loss tangent LTc is not less than 0.10, effectively protect the bead 10 portion. In the tire 2, high durability is maintained. In this viewpoint, the loss tangent LTc is more preferably not less than 0.12.

The complex elastic modulus Ei* of the inner layer 6b is preferably higher than or equal to 2 MPa. When the complex elastic modulus Ei* is higher than or equal to 2 MPa in the inner layer 6b, a difference between the complex elastic modulus Ei* of the inner layer 6b and the complex elastic modulus Eo* of the outer layer 6a can be reduced. In the tire 2, when the tire 2 is under a load, strain in a boundary between the inner layer 6b and the outer layer 6a can be reduced. In this viewpoint, the complex elastic modulus Ei* is more preferably higher than or equal to 2.5 MPa.

The complex elastic modulus Ei* is preferably not higher than 5 MPa. When the complex elastic modulus Ei* is not higher than 5 MPa in the inner layer 6b, stiffness in the side portions can be made appropriate. The tire 2 is excellent in ride comfort and steering stability.

The complex elastic modulus Eo* of the outer layer 6a is preferably higher than or equal to 3 MPa. When the complex elastic modulus Eo* is higher than or equal to 3 MPa in the outer layer 6a, durability is excellent. In this viewpoint, the complex elastic modulus Eo* is more preferably higher than or equal to 4 MPa.

The complex elastic modulus Eo* is preferably not higher than 15 MPa. In the tire 2 having the outer layer 6a in which the complex elastic modulus Eo* is not higher than 15 MPa, stiffness in the side portion can be appropriately adjusted. The tire 2 is excellent in ride comfort and steering stability.

The complex elastic modulus Ec* of the chafer 8 is preferably higher than or equal to 10 MPa. The chafers 8 in which the complex elastic modulus Ec* is higher than or equal to 10 MPa, effectively protect the bead 10 portion. The tire 2 is excellent in durability. In this viewpoint, the complex elastic modulus Ec* is more preferably higher than or equal to 15 MPa.

The complex elastic modulus Ec* is preferably not higher than 90 MPa. In the tire 2 having the chafers 8 in which the complex elastic modulus Ec* is not higher than 90 MPa, stiffness in the side portion can be appropriately adjusted. The tire 2 is excellent in ride comfort and steering stability.

In the present invention, the dimensions and angles of the tire 2 and each component of the tire 2 are measured in a state where the tire 2 is mounted on a normal rim and inflated with air to a normal internal pressure. During the measurement, no load is applied to the tire 2. In the description herein, the normal rim represents a rim that is specified according to the standard with which the tire 2 complies. The "standard rim" in the JATMA standard, the "Design Rim" in the TRA standard, and the "Measuring Rim" in the ETRTO standard are normal rims. In the description herein, the normal internal pressure represents an internal pressure that is specified according to the standard with which the tire 2 complies. The "maximum air pressure" in the JATMA standard, the "maximum value" recited in "TIRE LOAD LIMITS AT VARIOUS COLD INFLATION PRESSURES" in the TRA standard, and the "INFLATION PRESSURE" in the ETRTO standard are normal internal pressures. In the description herein, the normal load represents a load that is specified according to the standard with which the tire 2 complies. The "maximum load capacity" in the JATMA standard, the "maximum value" recited in "TIRE LOAD LIMITS AT VARIOUS COLD INFLATION PRESSURES" in the TRA standard, and the "LOAD CAPACITY" in the ETRTO standard, are normal loads.

EXAMPLES

Example 1

A tire, of example 1, having the structure shown in FIG. 1 was obtained. The size of the tire was 11R22.5. Specifications of the tire are indicated in Table 1. In the tire, the complex elastic modulus Ei* was 3 MPa, the complex elastic modulus Eo* was 3 MPa, and the complex elastic modulus Ec* was 50 MPa, which are not indicated in the table. The thickness Ti was 3 mm and the thickness Tc was 3 mm. Therefore, the ratio (Ti/Tc) was 1.0. The height Hr of a flange of a rim on which the tire was to be mounted was 12.7 mm.

Comparative Example 1

A tire of Comparative example 1 having the specifications indicated in Table 1 was obtained. In the tire, each sidewall had the outer layer and the inner layer, and the inner layer did not extend to the bead portion. This tire was a conventional tire.

Examples 2 to 5 and Comparative Example 2

Tires of examples 2 to 5 and comparative example 2 were each obtained in the same manner as for example 1 except that the height Hi was different, and the ratio (Hi/Hr) was as indicated in Table 1. In example 2, the inner side end of the inner layer reached a portion inward of the bead base line BBL. Therefore, the ratio represents a minus value. In comparative example 2, the position of the inner side end of the inner layer was equal to the contact point Po in the radial direction.

Examples 6 to 11

Tires of examples 6 to 11 were each obtained in the same manner as for example 1 except that the thickness Ti and the thickness Tc were changed such that the sum (Ti+Tc) of the thickness Ti and the thickness Tc was maintained constant, and the ratio (Ti/Tc) was as indicated in Table 2.

Examples 12 to 16 and Comparative Example 3

Tires of examples 12 to 16 and comparative example 3 were each obtained in the same manner as for example 1 except that the height Ho was different and the ratio (Ho/Hr) was as indicated in Table 3. In comparative example 3, the position of the inner side end of the inner layer was equal to the contact point Po in the radial direction.

Examples 17 to 22 and Comparative Example 4

Tires of examples 17 to 22 and comparative example 4 were each obtained in the same manner as for example 1 except that the height Hc was different and the ratio (Hc/Hr) was as indicated in Table 4. In comparative example 4, the position of the outer side end of the chafer was equal to the contact point Po in the radial direction.

Examples 23 to 28

Tires of examples 23 to 28 were each obtained in the same manner as for example 1 except that the loss tangent LTi was as indicated in Table 5.

Examples 29 to 34

Tires of examples 29 to 34 were each obtained in the same manner as for example 1 except that the loss tangent LTo was as indicated in Table 6.

Examples 35 to 40

Tires of examples 35 to 40 were each obtained in the same manner as for example 1 except that the loss tangent LTc was as indicated in Table 7.

[Rolling Resistance]

A rolling resistance testing machine was used to measure rolling resistance under the following measurement conditions.
Used rim: 7.50×22.5
Internal pressure: 800 kPa
Load: 29.42 kN
Speed: 80 km/h The results are indicated below as index values in Tables 1 to 7 with the result of comparative example 1 being 100. The less the value is, the lower rolling resistance is and the more excellent fuel efficiency is. The less the value is, the better the evaluation is.

[Evaluation for Durability]

For durability of bead portions, damage-to-bead resistance, crack resistance (referred to as CSC resistance) at the interface between the chafer and the sidewall, crack resistance (referred to as FCC resistance) at the interface between the filler and the chafer near the inner side portion, in the radial direction, of the bead, and external damage resistance, were evaluated. The evaluation methods were as follows.

[Evaluation for Damage-to-Bead Resistance]

A sample tire was mounted on a normal rim (7.50×22.5), and inflated with air to a normal internal pressure. The tire was mounted to a drum type tire testing machine, and vertical load corresponding to three times a normal load was applied to the tire. Running with the tire on the drum at the speed of 80 km/h was performed. A time that elapsed before the bead of the tire was damaged, was measured. The results are indicated below as index values in Tables 1 to 7 with the result of comparative example 1 being 100. The greater the value is, the better the evaluation is.

[Evaluation for CSC Resistance]

A sample tire was mounted on a normal rim (7.50×22.5), and inflated with air to a normal internal pressure. The tire was mounted to a vehicle, and a normal load was applied to the tire. The vehicle was caused to run on an asphalt road surface in a test course. The vehicle was caused to run until ribs (the groove depth was 14 mm) provided on the tread were all worn. Thereafter, the size of a crack at the interface between the chafer and the sidewall was measured. The CSC resistance obtained from the results is indicated below as indexes in Tables 1 to 7 with the result of comparative example 1 being 100. The greater the value of the index is, the better the evaluation is.

[Evaluation for FCC Resistance]

A vehicle was caused to run under the same condition as in the evaluation for CSC resistance. Thereafter, the size of a crack at the interface between the filler and the chafer near the inner side portion, in the radial direction, of the bead, was measured. The FCC resistance obtained from the results is indicated below as indexes in Tables 1 to 7 with the result of comparative example 1 being 100. The greater the value of the index is, the better the evaluation is.

[Evaluation for External Damage Resistance]

A vehicle was caused to run under the same condition as in the evaluation for CSC resistance. Thereafter, the number of external damages in the sidewall was counted and the sizes of the external damages therein were measured. The external damage resistance obtained from the results is indicated below as indexes in Tables 1 to 7 with the result of comparative example 1 being 100. The greater the value of the index is, the better the evaluation is.

TABLE 1

| | Evaluation result | | | | | | |
|---|---|---|---|---|---|---|---|
| | Comparative example 1 | Example 2 | Example 3 | Example 4 | Example 1 | Example 5 | Comparative example 2 |
| Ratio (Hi/Hr) | 3.0 | −0.5 | 0.0 | 0.5 | 1.0 | 1.5 | 2.0 |
| Ratio (Ho/Hr) | 1.0 | 2.0 | 2.0 | 2.0 | 2.0 | 2.0 | 2.0 |
| Ratio (Hc/Hr) | 2.0 | 4.0 | 4.0 | 4.0 | 4.0 | 4.0 | 4.0 |
| Ratio (Ti/Tc) | 0.0 | 1.0 | 1.0 | 1.0 | 1.0 | 1.0 | 1.0 |
| Loss tangent LTi | 0.04 | 0.04 | 0.04 | 0.04 | 0.04 | 0.04 | 0.04 |
| Loss tangent LTo | 0.07 | 0.07 | 0.07 | 0.07 | 0.07 | 0.07 | 0.07 |
| Loss tangent LTc | 0.17 | 0.17 | 0.17 | 0.17 | 0.17 | 0.17 | 0.17 |
| Rolling resistance | 100 | 90 | 90 | 91 | 92 | 93 | 95 |
| Damage-to-bead resistance | 100 | 100 | 100 | 100 | 100 | 98 | 80 |
| CSC resistance | 100 | 200 | 200 | 200 | 200 | 200 | 200 |
| FCC resistance | 100 | 50 | 90 | 100 | 100 | 100 | 100 |
| External damage resistance | 100 | 100 | 100 | 100 | 100 | 100 | 100 |

TABLE 2

| | Evaluation result | | | | | |
|---|---|---|---|---|---|---|
| | Example 6 | Example 7 | Example 8 | Example 9 | Example 10 | Example 11 |
| Ratio (Hi/Hr) | 1.0 | 1.0 | 1.0 | 1.0 | 1.0 | 1.0 |
| Ratio (Ho/Hr) | 2.0 | 2.0 | 2.0 | 2.0 | 2.0 | 2.0 |
| Ratio (Hc/Hr) | 4.0 | 4.0 | 4.0 | 4.0 | 4.0 | 4.0 |
| Ratio (Ti/Tc) | 0.2 | 0.5 | 0.7 | 1.3 | 1.5 | 1.7 |
| Loss tangent LTi | 0.04 | 0.04 | 0.04 | 0.04 | 0.04 | 0.04 |
| Loss tangent LTo | 0.07 | 0.07 | 0.07 | 0.07 | 0.07 | 0.07 |
| Loss tangent LTc | 0.17 | 0.17 | 0.17 | 0.17 | 0.17 | 0.17 |
| Rolling resistance | 98 | 94 | 93 | 91 | 90 | 90 |
| Damage-to-bead resistance | 100 | 100 | 100 | 100 | 98 | 80 |
| CSC resistance | 200 | 200 | 200 | 200 | 200 | 200 |
| FCC resistance | 100 | 100 | 100 | 100 | 100 | 100 |
| External damage resistance | 100 | 100 | 100 | 100 | 100 | 100 |

TABLE 3

| | Evaluation result | | | | | |
|---|---|---|---|---|---|---|
| | Comparative example 3 | Example 12 | Example 13 | Example 14 | Example 15 | Example 16 |
| Ratio (Hi/Hr) | 1.0 | 1.0 | 1.0 | 1.0 | 1.0 | 1.0 |
| Ratio (Ho/Hr) | 1.0 | 1.5 | 1.8 | 2.5 | 3.0 | 3.5 |
| Ratio (Hc/Hr) | 4.0 | 4.0 | 4.0 | 4.0 | 4.0 | 4.0 |
| Ratio (Ti/Tc) | 0.0 | 1.0 | 1.0 | 1.0 | 1.0 | 1.0 |
| Loss tangent LTi | 0.04 | 0.04 | 0.04 | 0.04 | 0.04 | 0.04 |
| Loss tangent LTo | 0.07 | 0.07 | 0.07 | 0.07 | 0.07 | 0.07 |
| Loss tangent LTc | 0.17 | 0.17 | 0.17 | 0.17 | 0.17 | 0.17 |
| Rolling resistance | 91 | 91 | 92 | 93 | 95 | 98 |
| Damage-to-bead resistance | 100 | 100 | 100 | 100 | 100 | 100 |
| CSC resistance | 200 | 200 | 200 | 200 | 200 | 200 |
| FCC resistance | 100 | 100 | 100 | 100 | 100 | 100 |
| External damage resistance | 70 | 95 | 100 | 100 | 100 | 100 |

TABLE 4

| | Evaluation result | | | | | | |
|---|---|---|---|---|---|---|---|
| | Comparative example 4 | Example 17 | Example 18 | Example 19 | Example 20 | Example 21 | Example 22 |
| Ratio (Hi/Hr) | 1.0 | 1.0 | 1.0 | 1.0 | 1.0 | 1.0 | 1.0 |
| Ratio (Ho/Hr) | 2.0 | 2.0 | 2.0 | 2.0 | 2.0 | 2.0 | 2.0 |
| Ratio (Hc/Hr) | 2.0 | 2.5 | 3.0 | 3.5 | 4.5 | 5.0 | 5.5 |
| Ratio (Ti/Tc) | 0.0 | 1.0 | 1.0 | 1.0 | 1.0 | 1.0 | 1.0 |
| Loss tangent LTi | 0.04 | 0.04 | 0.04 | 0.04 | 0.04 | 0.04 | 0.04 |

TABLE 4-continued

Evaluation result

|  | Comparative example 4 | Example 17 | Example 18 | Example 19 | Example 20 | Example 21 | Example 22 |
|---|---|---|---|---|---|---|---|
| Loss tangent LTo | 0.07 | 0.07 | 0.07 | 0.07 | 0.07 | 0.07 | 0.07 |
| Loss tangent LTc | 0.17 | 0.17 | 0.17 | 0.17 | 0.17 | 0.17 | 0.17 |
| Rolling resistance | 90 | 90 | 90 | 91 | 93 | 95 | 97 |
| Damage-to-bead resistance | 75 | 85 | 98 | 100 | 100 | 100 | 100 |
| CSC resistance | 200 | 200 | 200 | 200 | 200 | 200 | 200 |
| FCC resistance | 100 | 100 | 100 | 100 | 100 | 100 | 100 |
| External damage resistance | 100 | 100 | 100 | 100 | 100 | 100 | 100 |

TABLE 5

Evaluation result

|  | Example 23 | Example 24 | Example 25 | Example 26 | Example 27 | Example 28 |
|---|---|---|---|---|---|---|
| Ratio (Hi/Hr) | 1.0 | 1.0 | 1.0 | 1.0 | 1.0 | 1.0 |
| Ratio (Ho/Hr) | 2.0 | 2.0 | 2.0 | 2.0 | 2.0 | 2.0 |
| Ratio (Hc/Hr) | 4.0 | 4.0 | 4.0 | 4.0 | 4.0 | 4.0 |
| Ratio (Ti/Tc) | 0.0 | 1.0 | 1.0 | 1.0 | 1.0 | 1.0 |
| Loss tangent LTi | 0.01 | 0.02 | 0.03 | 0.045 | 0.05 | 0.06 |
| Loss tangent LTo | 0.07 | 0.07 | 0.07 | 0.07 | 0.07 | 0.07 |
| Loss tangent LTc | 0.17 | 0.17 | 0.17 | 0.17 | 0.17 | 0.17 |
| Rolling resistance | 88 | 90 | 91 | 93 | 95 | 98 |
| Damage-to-bead resistance | 85 | 95 | 100 | 100 | 100 | 100 |
| CSC resistance | 200 | 200 | 200 | 200 | 200 | 200 |
| FCC resistance | 100 | 100 | 100 | 100 | 100 | 100 |
| External damage resistance | 100 | 100 | 100 | 100 | 100 | 100 |

TABLE 6

Evaluation result

|  | Example 29 | Example 30 | Example 31 | Example 32 | Example 33 | Example 34 |
|---|---|---|---|---|---|---|
| Ratio (Hi/Hr) | 1.0 | 1.0 | 1.0 | 1.0 | 1.0 | 1.0 |
| Ratio (Ho/Hr) | 2.0 | 2.0 | 2.0 | 2.0 | 2.0 | 2.0 |
| Ratio (Hc/Hr) | 4.0 | 4.0 | 4.0 | 4.0 | 4.0 | 4.0 |
| Ratio (Ti/Tc) | 0.0 | 1.0 | 1.0 | 1.0 | 1.0 | 1.0 |
| Loss tangent LTi | 0.04 | 0.04 | 0.04 | 0.04 | 0.04 | 0.04 |
| Loss tangent LTo | 0.04 | 0.05 | 0.06 | 0.09 | 0.10 | 0.11 |
| Loss tangent LTc | 0.17 | 0.17 | 0.17 | 0.17 | 0.17 | 0.17 |
| Rolling resistance | 90 | 90 | 91 | 93 | 94 | 97 |
| Damage-to-bead resistance | 100 | 100 | 100 | 100 | 100 | 100 |

TABLE 6-continued

Evaluation result

|  | Example 29 | Example 30 | Example 31 | Example 32 | Example 33 | Example 34 |
|---|---|---|---|---|---|---|
| CSC resistance | 200 | 200 | 200 | 200 | 200 | 200 |
| FCC resistance | 100 | 100 | 100 | 100 | 100 | 100 |
| External Damage resistance | 100 | 100 | 100 | 100 | 100 | 100 |

TABLE 7

Evaluation result

|  | Example 35 | Example 36 | Example 37 | Example 38 | Example 39 | Example 40 |
|---|---|---|---|---|---|---|
| Ratio (Hi/Hr) | 1.0 | 1.0 | 1.0 | 1.0 | 1.0 | 1.0 |
| Ratio (Ho/Hr) | 2.0 | 2.0 | 2.0 | 2.0 | 2.0 | 2.0 |
| Ratio (Hc/Hr) | 4.0 | 4.0 | 4.0 | 4.0 | 4.0 | 4.0 |
| Ratio (Ti/Tc) | 0.0 | 1.0 | 1.0 | 1.0 | 1.0 | 1.0 |
| Loss tangent LTi | 0.04 | 0.04 | 0.04 | 0.04 | 0.04 | 0.04 |
| Loss tangent LTo | 0.07 | 0.07 | 0.07 | 0.07 | 0.07 | 0.07 |
| Loss tangent LTc | 0.08 | 0.10 | 0.12 | 0.28 | 0.30 | 0.32 |
| Rolling resistance | 88 | 89 | 91 | 95 | 97 | 99 |
| Damage-to-bead resistance | 85 | 93 | 100 | 100 | 100 | 100 |
| CSC resistance | 200 | 200 | 200 | 200 | 200 | 200 |
| FCC resistance | 100 | 100 | 100 | 100 | 100 | 100 |
| External damage resistance | 100 | 100 | 100 | 100 | 100 | 100 |

As indicated in Tables 1 to 7, in the tires of the present invention, rolling resistance is reduced while durability is advantageously maintained. The evaluation result clearly indicates that the present invention is superior.

The tire according to the present invention can be mounted to various vehicles.

The foregoing description is in all aspects illustrative, and various modifications can be devised without departing from the essential features of the invention.

What is claimed is:

1. A pneumatic tire comprising:
a tread having an outer surface which forms a tread surface;
a pair of sidewalls that extend almost inward from ends, respectively, of the tread in a radial direction;
chafers disposed inward of the sidewalls, respectively, in the radial direction; and
a pair of beads disposed inward of the chafers, respectively, in an axial direction,
wherein each bead includes a core,
wherein the sidewalls each include an outer layer, and an inner layer disposed inward of the outer layer in the axial direction, the inner layer extends to a region between a corresponding one of the beads and a corresponding one of the chafers,
wherein in the radial direction, an outer side end of the inner layer is disposed outward of an outer side end of the bead,
wherein in the radial direction, an inner side end of the inner layer is disposed inward of an outer side end of the core,
wherein an outer side end of the inner layer reaches the tread, and
wherein the outer layer contacts with a corresponding one of the chafers,
wherein
when Po represents a contact point, on an outer surface of the tire, at which the outer layer and a corresponding one of the chafers contact with each other, an inner side end, in the radial direction, of the outer layer is equal to the contact point Po, in the radial direction, an outer side end of each chafer is disposed outward of the contact point Po, and in the radial direction, an inner side end of the inner layer is disposed inward of the contact point Po,
a loss tangent LTi of the inner layer is less than a loss tangent LTo of the outer layer and a loss tangent LTc of the chafers, and
a ratio (Hi/12.7 mm) of a height Hi, in the radial direction, from a bead base line BBL to the inner side end of the inner layer, relative to a height of 12.7 mm, in the radial direction, from the bead base line BBL to an outer side end of a flange of a rim on which the tire is mounted, is greater than or equal to 0.0 and not greater than 1.5.

2. The pneumatic tire according to claim 1, wherein
L1 represents an imaginary line that extends in the axial direction such that a distance, in the radial direction, from the bead base line BBL to the imaginary line L1, is 2.5 times the height 12.7 mm, and
Ti represents a thickness, of the inner layer, measured along the imaginary line L1, and Tc represents a thickness, of each chafer, measured along the imaginary line L1, and a ratio (Ti/Tc) of the thickness Ti to the thickness Tc is greater than or equal to 0.5 and not greater than 1.5.

3. The pneumatic tire according to claim 1, wherein when Ho represents a height, in the radial direction, from the bead base line BBL to the contact point Po, a ratio (Ho/12.7 mm) of the height Ho to the height 12.7 mm is greater than or equal to 1.5 and not greater than 3.0.

4. The pneumatic tire according to claim 1, wherein He represents a height, in the radial direction, from the bead base line BBL to the outer side end of each chafer, and a ratio (Hc/12.7 mm) of the height Hc to the height 12.7 mm is greater than or equal to 3.0 and not greater than 5.0.

5. The pneumatic tire according to claim 1, wherein the loss tangent LTi is higher than or equal to 0.02 and not higher than 0.05.

6. The pneumatic tire according to claim 1, wherein the loss tangent LTo is higher than or equal to 0.05 and not higher than 0.10.

7. The pneumatic tire according to claim 1, wherein the loss tangent LTc is higher than or equal to 0.10 and not higher than 0.30.

8. The pneumatic tire according to claim 1, wherein
L1 represents an imaginary line that extends in the axial direction such that a distance, in the radial direction, from the bead base line BBL to the imaginary line L1 is 2.5 times the height 12.7 mm, and
Ti represents a thickness, of the inner layer, measured along the imaginary line L1, wherein the thickness Ti is greater than or equal to 2.0 mm and not greater than 5.5 mm.

9. The pneumatic tire according to claim 1, wherein
L1 represents an imaginary line that extends in the axial direction such that a distance, in the radial direction, from the bead base line BBL to the imaginary line L1 is 2.5 times the height 12.7 mm, and
Tc represents a thickness, of the chafer measured along the imaginary line L1, wherein the thickness Tc is greater than or equal to 2.0 mm and not greater than 5.5 mm.

* * * * *